(12) United States Patent
Donlan et al.

(10) Patent No.: US 11,530,007 B2
(45) Date of Patent: Dec. 20, 2022

(54) ROTATING INSTALLATION FOR AN IDLER BLOCK

(71) Applicant: Caterpillar Inc., Deerfield, IL (US)

(72) Inventors: Zachary T. Donlan, Peoria, IL (US); Benjamin I. Jones, Bartonville, IL (US); Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 767 days.

(21) Appl. No.: 16/539,351

(22) Filed: Aug. 13, 2019

(65) Prior Publication Data

US 2021/0046982 A1    Feb. 18, 2021

(51) Int. Cl.
| | | |
|---|---|---|
| *B62D 55/15* | (2006.01) | |
| *B62D 55/10* | (2006.01) | |
| *B62D 55/32* | (2006.01) | |
| *B62D 55/14* | (2006.01) | |

(52) U.S. Cl.
CPC ............. *B62D 55/15* (2013.01); *B62D 55/10* (2013.01); *B62D 55/32* (2013.01); *B62D 55/14* (2013.01)

(58) Field of Classification Search
CPC ........ B62D 55/10; B62D 55/14; B62D 55/15; B62D 55/32
See application file for complete search history.

(56) References Cited

U.S. PATENT DOCUMENTS

| 5,044,812 | A | 9/1991 | Ardelt et al. |
|---|---|---|---|
| 6,669,450 | B2 * | 12/2003 | Jeong ................. F04B 27/0839 91/499 |
| 9,187,140 | B2 | 11/2015 | Sandoval, Jr. et al. |
| 2002/0192084 | A1 * | 12/2002 | Jeong ................. F04B 27/0839 417/269 |
| 2006/0049692 | A1 | 3/2006 | Livesay et al. |
| 2007/0057575 | A1 | 3/2007 | Brandt et al. |
| 2009/0293252 | A1 | 12/2009 | Bradberry et al. |

FOREIGN PATENT DOCUMENTS

| CN | 108382476 A | 8/2018 |
|---|---|---|
| CN | 106364866 B | 1/2019 |

* cited by examiner

*Primary Examiner* — Tyler J Lee

(57) ABSTRACT

A replacement kit includes a first coupler that includes a first inner axial end, a first outer axial end, and a first coupler attachment portion including a first forked oblong structure that defines a first minor axis with a first minor axis length, and a first major axis with a first major axis length that is greater than the first minor axis length, and including a first prong, a second prong disposed axially away from the first prong, and defining a first predetermined axial distance, and a first cam surface disposed between the first prong and the second prong.

9 Claims, 9 Drawing Sheets

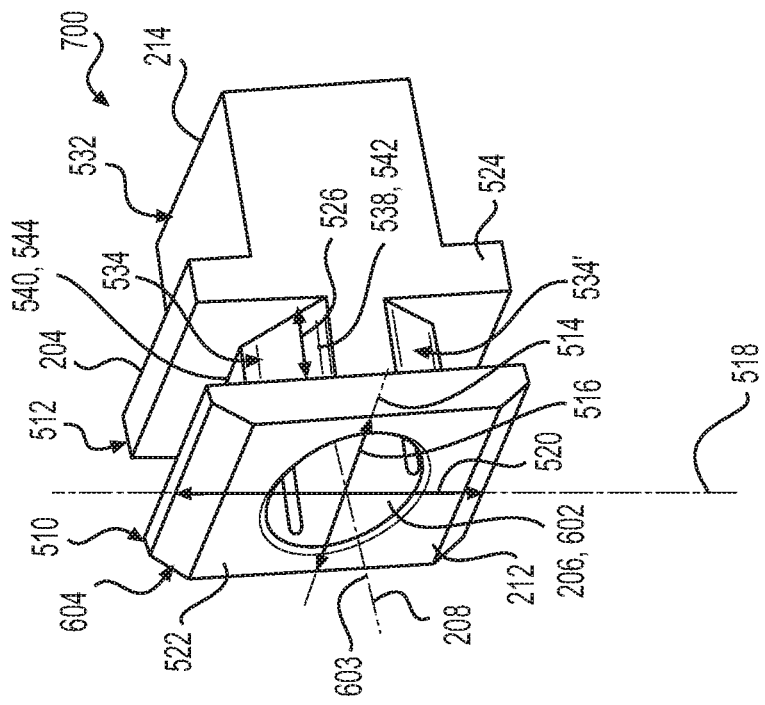
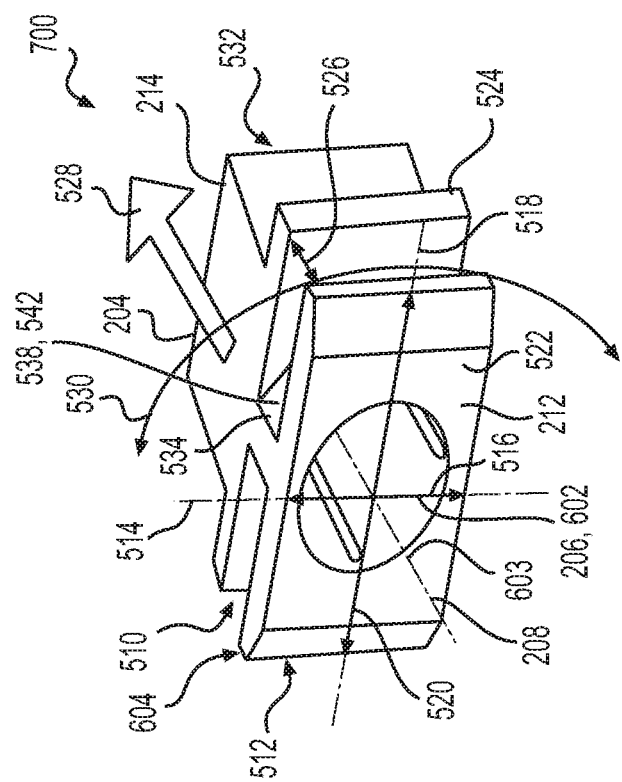
FIG. 6
FIG. 5

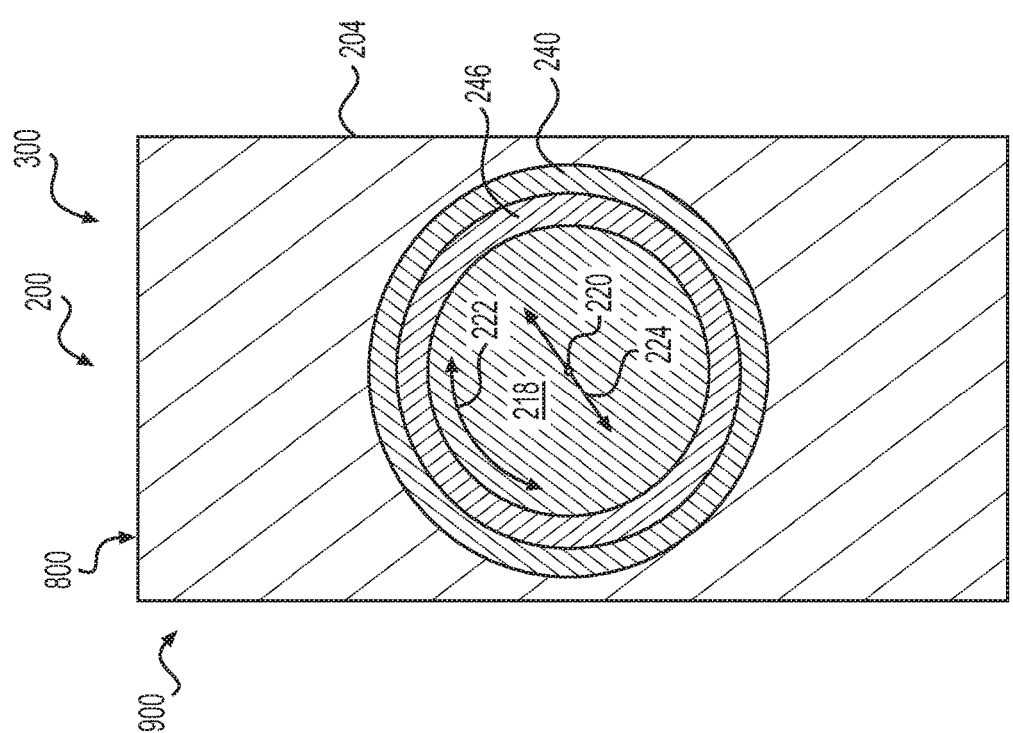

ROTATING INSTALLATION FOR AN IDLER BLOCK

TECHNICAL FIELD

The present disclosure relates to assemblies employed on the track driven undercarriage used by earth moving, mining, construction equipment and the like for providing a rotating attachment of an idler wheel or the like to the frame of the undercarriage. More specifically, the present disclosure relates to idler blocks used in such equipment.

BACKGROUND

Machines such as bulldozers, wheel loaders, excavators, and the like employ track driven undercarriages to propel them. An idler wheel or the like (e.g. a roller, a sprocket, etc.) may be used to guide the movement of the track. Hence, the idler wheel typically has a rotating attachment to the frame of the undercarriage. It is necessary to attach and detach the idler wheel or the like from the frame, requiring that the rotating attachment assembly to be assembled and disassembled, preferably quickly in order to perform maintenance. Various devices have been employed to provide a quick and efficient way to attach and detach the rotating attachment assembly to the frame of the undercarriage but they may not provide an attachment that is robust. On the other hand, other devices are robust but do not provide a quick and easy attachment method.

U.S. Pat. No. 9,187,140 B2 discloses a rotating attachment assembly that uses a plurality of bolts to attach the idler block of the rotating attachment assembly to the frame of the undercarriage. While this method is robust, it takes longer than desired to disassemble the rotating attachment assembly.

Thus, an apparatus and method is desired to provide an attachment of the rotating attachment assembly to the frame of a track driven undercarriage that is both more robust and more time efficient.

SUMMARY OF THE DISCLOSURE

A rotating member attachment assembly according to an embodiment of the present disclosure comprises a shaft including a cylindrical configuration defining a cylindrical axis, a circumferential direction, and a radial direction. The shaft further defines a first axial end and a second axial end along the cylindrical axis. A first coupler defines a first hole that defines a first hole axis and that is configured to receive the shaft. The first coupler further includes a first inner axial end, and a first outer axial end. The first coupler further includes a first coupler attachment portion disposed adjacent to the first inner axial end including a first forked oblong structure that defines a first minor axis with a first minor axis length, and a first major axis with a first major axis length that is greater than the first minor axis length. The first forked oblong structure includes a first prong disposed proximate to the first inner axial end of the first coupler and a second prong disposed axially away from the first prong a first predetermined axial distance toward the first outer axial end of the first coupler.

A replacement kit according to an embodiment of the present disclosure includes a first coupler that includes a first inner axial end, a first outer axial end, and a first coupler attachment portion including a first forked oblong structure that defines a first minor axis with a first minor axis length, and a first major axis with a first major axis length that is greater than the first minor axis length, and including a first prong, a second prong disposed axially away from the first prong, and defining a first predetermined axial distance, and a first cam surface disposed between the first prong and the second prong.

An undercarriage assembly according to an embodiment comprises a first frame member that defines a first frame member thickness, a rectangular window defining a width, and a length that is greater than the width, a shaft including a cylindrical configuration defining a cylindrical axis, a circumferential direction, and a radial direction, the shaft further defining a first axial end, a second axial end. A first coupler is coupled to the first frame member. The first coupler defines a first thru-hole that defines a first thru-hole axis and that is configured to receive the shaft, the first coupler further including a first inner axial end, and a first outer axial end. The first coupler further includes a first coupler attachment portion disposed adjacent to the first inner axial end including a first forked rectangular structure that defines a first minor axis with a first minor axis length, and a first major axis with a first major axis length that is greater than the first minor axis length. The first forked rectangular structure includes a first prong disposed proximate to the first inner axial end of the first coupler and a second prong disposed axially away from the first prong a first predetermined axial distance toward the first outer axial end that is equal to or greater than the first frame member thickness. The length of the rectangular window of the first frame member is parallel with the first minor axis of the first forked rectangular structure.

BRIEF DESCRIPTION OF THE DRAWINGS

FIG. 5 illustrates the coupler of FIG. 4 rotated as compared to FIG. 4 allowing the coupler to fit within and be inserted into the aperture of the frame.

FIG. 6 illustrates the coupler of FIG. 5 after having been rotated 90 degrees about the axis of the coupler to achieve the installed configuration shown in FIG. 4.

FIG. 10 is a side sectional view of the rotating member attachment assembly of FIG. 9 taken along lines 10-10 thereof.

DETAILED DESCRIPTION

Figure 1:
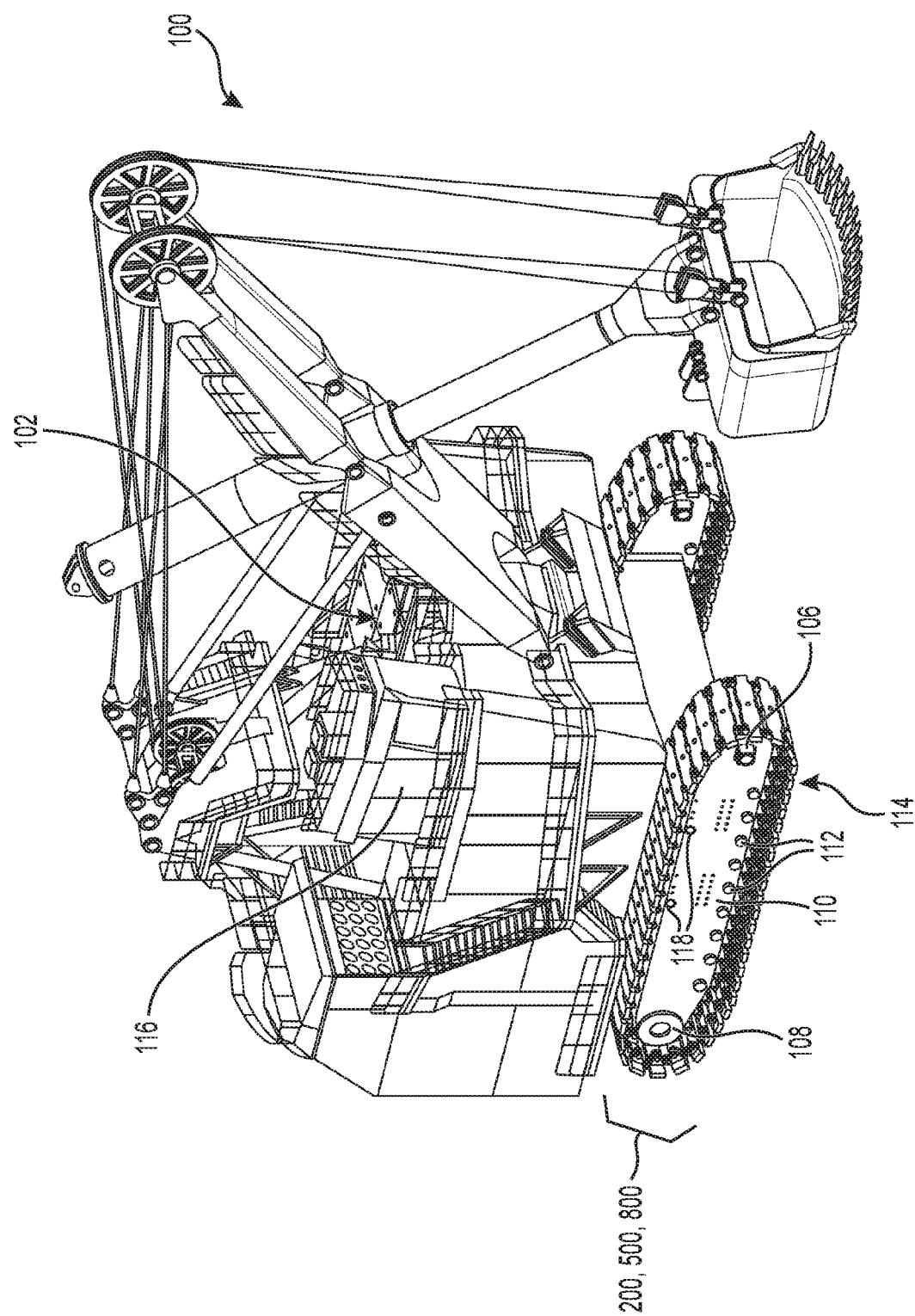
FIG. 1 is a side view of a track-driven machine (e.g. an electric rope shovel) that may use a rotating member attachment assembly to attach an idler wheel or the like to the frame of an undercarriage assembly of the machine according to various embodiments of the present disclosure.
Figure 2:
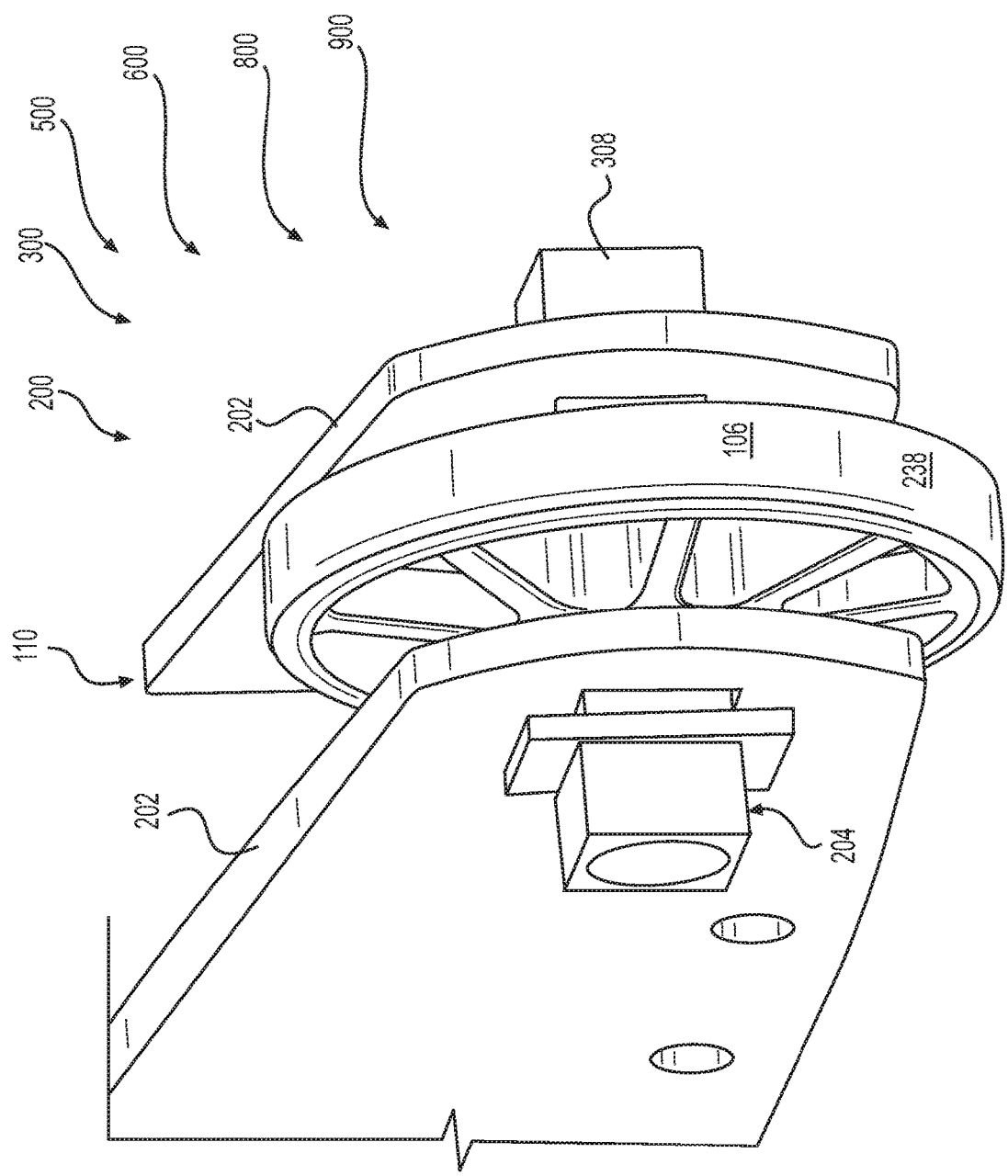
FIG. 2 is a perspective view of the frame and the idler wheel of the undercarriage assembly of the machine of FIG. 1, depicting a rotating member attachment assembly including an idler block (may also be referred to as a coupler) that couples the idler wheel to the frame shown in isolation from the machine of FIG. 1.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

First, a machine that may use various embodiments of an undercarriage assembly, a rotating member attachment assembly, and a replacement kit for use with a rotating member attachment assembly according to various embodiments of the present disclosure will be discussed. Then, particular embodiments of the undercarriage assembly, the rotating member attachment assembly, and the replacement kit will be discussed.

Starting with FIG. 1, an exemplary machine 100 in the form of a track-driven electric rope shovel that may use various embodiments of the present disclosure can be seen. The machine includes an engine 102, an undercarriage assembly 200, 500, 800 that includes an idler 106 and/or a sprocket 108, a frame 110 to which the idler 106 is attached, support rollers 112 attached to the frame, a track subassembly 114 routed about the idler 106, sprocket 108, the support rollers 112, the carrier rollers 118, and an operator cab 116 that houses controls (not shown) for controlling the engine 102 and the transmission (not shown). Hence, the track subassembly 114 is able to be driven by the sprocket 108 about the idler 106 and support rollers 112 that rotate to facilitate the linear movement of the track subassembly 114 and the machine 100.

Other forms of track-driven machines such as excavators, hydraulic mining shovels, bulldozers, etc. may use various embodiments of the undercarriage assembly 200, 500, 800, rotating member attachment assembly 300, 600, 900, and the replacement kit 400, 700, 1000 of the present disclosure as will be seen in FIGS. 2 thru 10.

Looking now at FIGS. 2 thru 10, an undercarriage assembly 200 according to an embodiment of the present disclosure that may be used with the machine of FIG. 1 will now be discussed. The undercarriage assembly 200 may comprise a first frame member 202 (may be a part of the frame 110 shown in FIG. 1), and a first coupler 204 (may also be referred to as an idler block, attachment block, etc.) that is coupled to the first frame member 202.

Figure 7:
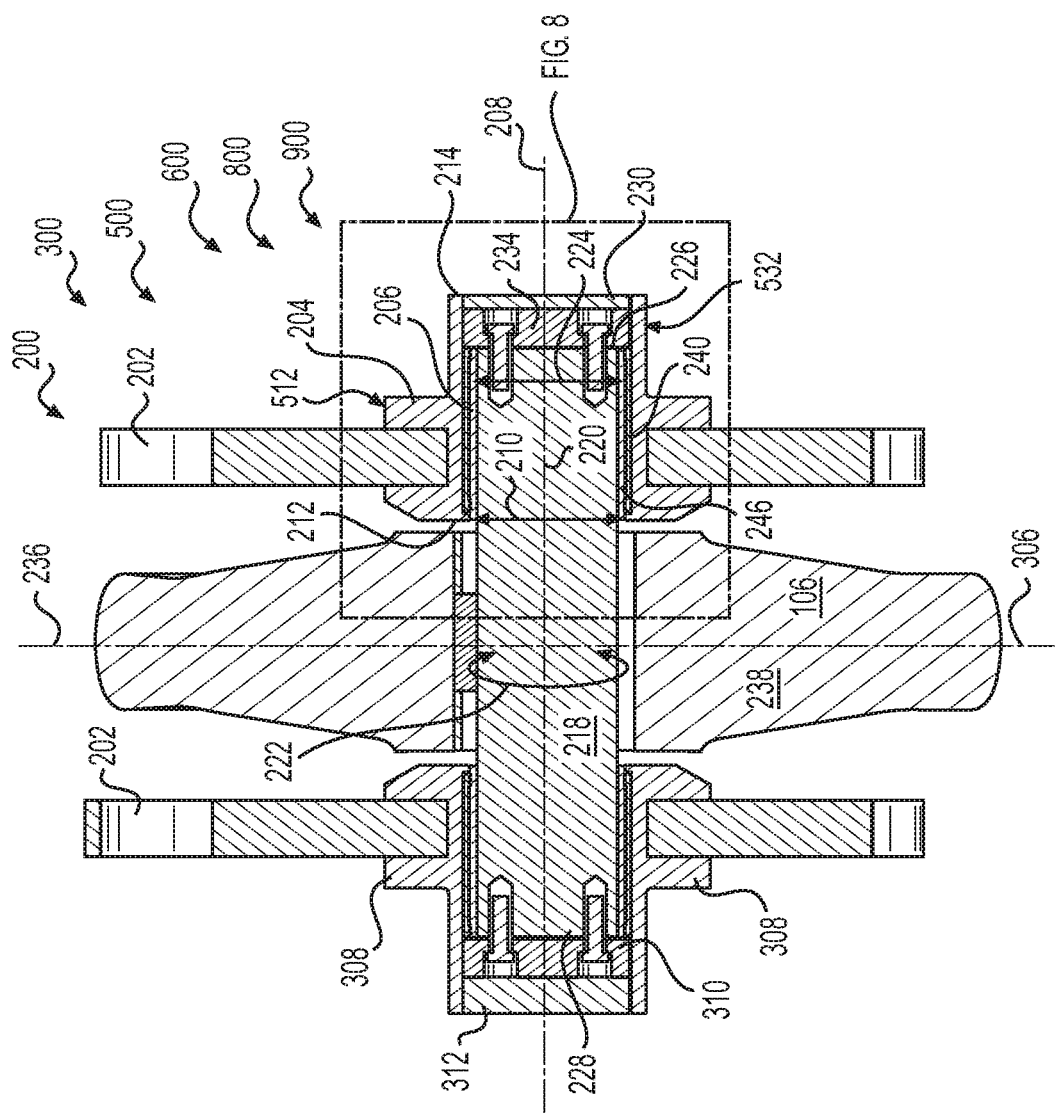
FIG. 7 is a front sectional view of the frame, idler wheel, and rotating member attachment assembly of FIG. 2, revealing the inner workings of the rotating member attachment mechanism.
Figure 8:
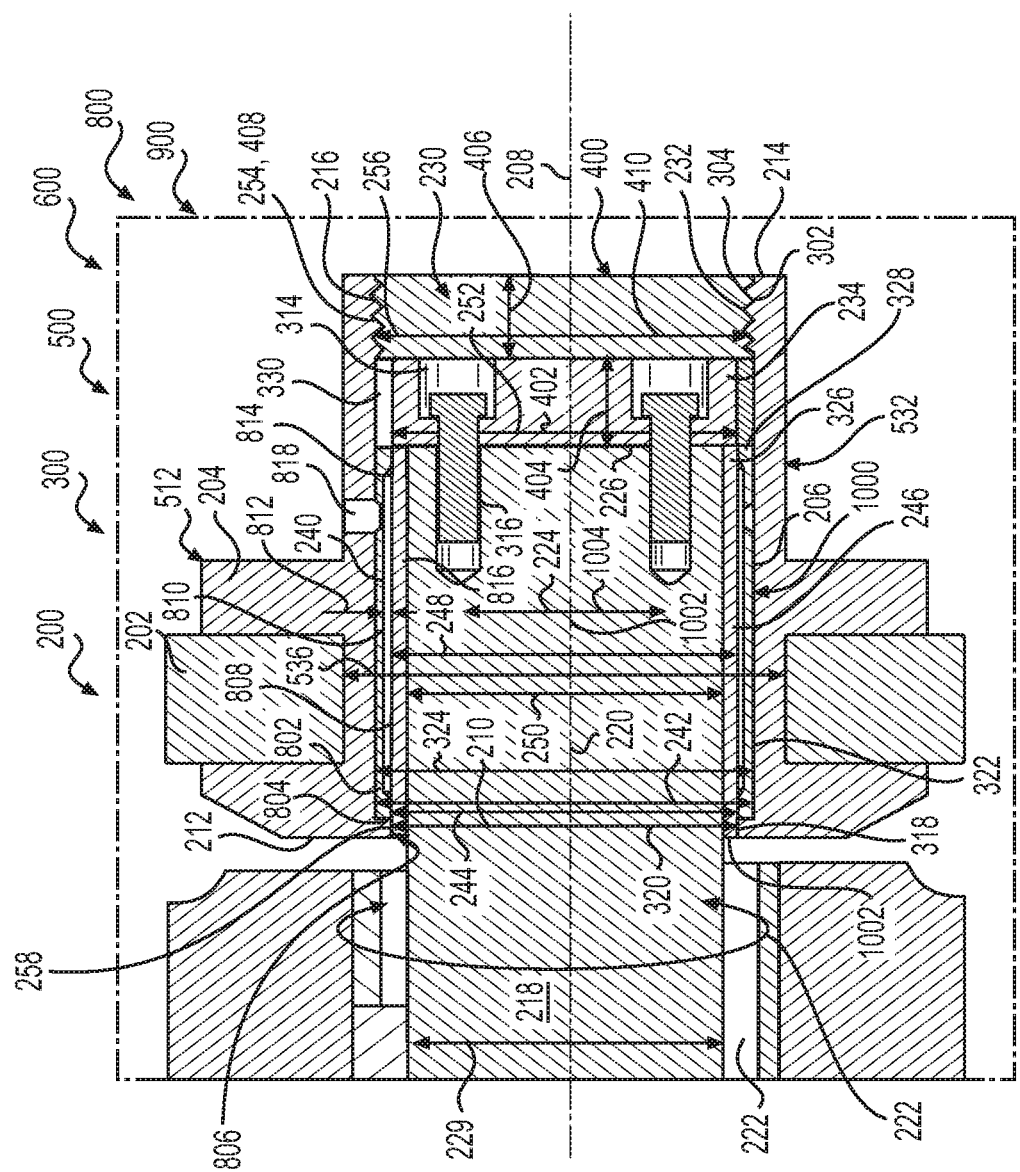
FIG. 8 is an enlarged detail view taken from FIG. 7, showing the bushings, threaded end cap, and thrust washer of the rotating member attachment assembly more clearly.
Figure 9:
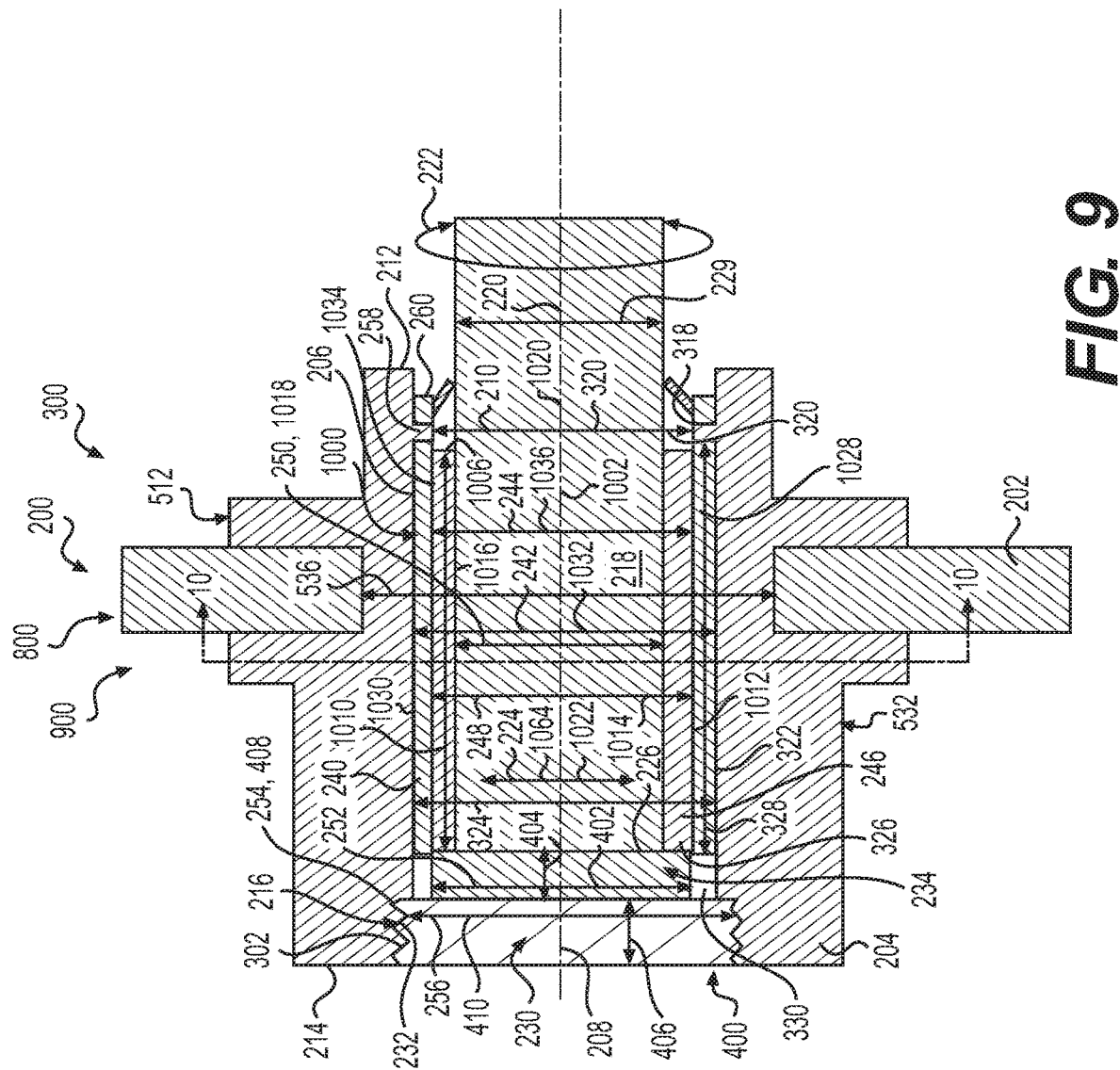
FIG. 9 contains an alternate construction similar to that of FIG. 8 according to another embodiment of the rotating member attachment assembly of the present disclosure.

As best seen in FIGS. in FIGS. 7 thru 9, the first coupler 204 may define a first thru-hole 206 that defines a first thru-hole axis 208, and a first thru-hole minimum diameter 210. The first coupler 204 may include a first inner axial end 212, a first outer axial end 214, and a first set of internal threads 216 disposed in the first thru-hole 206 at the first outer axial end 214.

The undercarriage assembly 200 may further comprise a shaft 218 including a cylindrical configuration defining a cylindrical axis 220, a circumferential direction 222, and a radial direction 224. The shaft 218 may further define a first axial end 226, a second axial end 228 (see FIG. 7), and a shaft diameter 229 that is less than the first thru-hole minimum diameter 210 of the first coupler 204 (see FIGS. 8 and 9). Thus, the shaft 218 may fit within the first coupler 204.

The undercarriage assembly 200 may further comprise a first end cap 230 that includes a first plurality of external threads 232 that mate with the first set of internal threads 216 of the first coupler 204, and a first thrust washer 234 disposed axially in the first thru-hole 206 of the first coupler 204 between the first end cap 230 and the first axial end 226 of the shaft 218.

As a result of this structure, the first end cap 230 may be configured to contact the first thrust washer 234. In turn, the first thrust washer 234 may be configured to contact the first axial end 226 of the shaft 218, so that as the first end cap 230 is tightened when wear occurs to the first thrust washer 234, the first end cap 230 axially pushes the first thrust washer 234.

Consequently, the first end cap 230, the first thrust washer 234, and the shaft 218 are configured such that tightening the first end cap 230 removes play between the first thrust washer 234 and the shaft 218 or re-centers the shaft 218 relative to the undercarriage assembly 200 (e.g. relative to the axial midplane 236 shown in FIG. 7).

This may help a rotating member 238 (e.g. an idler 106, a roller, a sprocket, etc.) that is part of the undercarriage assembly 200 and that is configured to rotate about the shaft 218 from contacting the first frame member 202 as the first thrust washer 234 wears over time.

With continued reference to FIGS. 7 thru 9, the undercarriage assembly 200 may further comprise a first coupler bushing 240 axially disposed in the first thru-hole 206 of the first coupler 204. The first coupler bushing 240 may define a first coupler bushing outer diameter 242, and a first coupler bushing inner diameter 244.

Similarly, the undercarriage assembly 200 may further comprise a first shaft bushing 246 axially disposed in the first thru-hole 206 of the first coupler 204. The first shaft bushing 246 may define a first shaft bushing outer diameter 248 that is less than the first coupler bushing inner diameter 244, and a first shaft bushing inner diameter 250 that is greater than the shaft diameter 229 (at least locally if pressed onto the shaft). As a result of this structure, the shaft 218 may fit within the first shaft bushing 246 while the first shaft bushing 246 may fit within the first coupler bushing 240. In some embodiments, the first coupler bushing 240 may be press-fit into the first thru-hole 206 of the first coupler 204, and the first shaft bushing 246 may press-fit onto the shaft 218. There may be a slip fit between the first coupler bushing 204 and the first shaft bushing 246 so that the shaft 218 may translate axially as the first thrust washer 234 wears. Other fits and attachments for these various components are possible in other embodiments of the present disclosure.

As best seen in FIGS. 8 and 9, the first thrust washer 234 may define a first thrust washer diameter 252 that is less than or equal to the first shaft bushing outer diameter 248.

The first end cap 230 may include a first end cap circumferential surface 254 defining a first end cap diameter 256 that is greater than the first thrust washer diameter 252, and the first coupler bushing outer diameter 242. This may not be the case for other embodiments of the present disclosure.

In some embodiments such as that shown in FIG. 9, the first coupler 204 further comprises a first ledge 258 that is disposed in the first thru-hole 206 (thus defining the first thru-hole minimum diameter 210) that is spaced axially away from the first inner axial end 212 of the first coupler 204. In such an embodiment, the undercarriage assembly 200 further comprises a dust seal 260 that is axially abutting the first ledge 258 and that is disposed axially proximate to the first inner axial end 212 of the first coupler 204. This may not be the case in other embodiments (e.g. see FIG. 8).

Other dimensions, configurations and relative placement of various features and components are possible in other embodiments of the present disclosure other than what has just been discussed.

Referring once more to FIGS. 2 thru 10, a rotating member attachment assembly 300 according to an embodiment of the present disclosure that may be used with the undercarriage assembly 200 just described will now be discussed.

Focusing on FIGS. 7 thru 9, the rotating member attachment assembly 300 may comprise a shaft 218 including a cylindrical configuration defining a cylindrical axis 220, a circumferential direction 222, and a radial direction 224. The shaft may further define a first axial end 226, and a second axial end 228 disposed along the cylindrical axis 220.

The rotating member attachment assembly 300 may further comprise a first coupler 204 defining a first thru-hole 206 that defines a first thru-hole axis 208 and that is configured to receive the shaft 218. The first coupler 204 may further include a first inner axial end 212, a first outer axial end 214, and a first set of threads 302 disposed at the first outer axial end 214.

The rotating member attachment assembly 300 may also include a first end cap 230 that includes a first plurality of threads 304 that mate with the first set of threads 302 of the first coupler 204, and a first thrust washer 234 disposed axially in the first thru-hole 210 between the first end cap 230 and the first axial end 226 of the shaft 218.

As a result of this structure, the first end cap 230 may be configured to contact the first thrust washer 234, and the first thrust washer 234 may be configured to contact the first axial end 226 of the shaft 218. So, the first end cap 230 may be configured to be tightened when wear occurs to the first thrust washer 234 to axially push the first thrust washer 234.

In the embodiments shown in FIGS. 7 thru 9, the first set of threads 302 of the first coupler 204 includes a first set of internal threads 216, and the first plurality of threads 304 of the first end cap 230 includes a first plurality of external threads 232. An opposite arrangement may be employed in other embodiments of the present disclosure. The first end cap 230, the first thrust washer 234, and the shaft 218 are configured such that tightening the first end cap 230 removes play between the first thrust washer 234 and the shaft 218 or re-centers the shaft 218 relative to the rotating member attachment assembly 300 (relative to the axial midplane 306 defined by the rotating member attachment assembly 300 in FIG. 7).

In FIG. 7, it can be seen that the rotating member attachment assembly 300 may also include a second coupler 308 that is identically configured as the first coupler 204, and is oriented in a symmetrical manner about the axial midplane relative 306 to the first coupler 204, a second thrust washer 310 that is identically configured as the first thrust washer 234, and is oriented in a symmetrical manner about the axial midplane 306 relative to the first thrust washer 234, and a second end cap 312 that is identically configured as the first end cap 230, and is oriented is oriented in a symmetrical manner about the axial midplane 306 relative to the first end cap 230. The shaft 218 may also be symmetrical about the axial midplane 306, and the first thru-hole axis 208 may be coextensive (may also be referred to as coincident) with the cylindrical axis 220 of the shaft 218. This may not be the case in other embodiments of the present disclosure.

As best seen in FIG. 8, the first thrust washer 234 may define at least a first fastener counterbore 314, and the first axial end 226 of the shaft 218 may define at least a first threaded hole 316 that is aligned with the first fastener counterbore 314. So, the first thrust washer 234 may be fastened to the shaft 218. For the embodiment shown in FIGS. 7 and 8, four such threaded holes and fastener counterbores are provided that are arranged in a square array. Other methods for attaching or aligning the thrust washer to the shaft may be employed in other embodiments (e.g. dowel pins may be used, etc.).

In FIGS. 8 and 9, the first coupler 204 may define a first ledge 258 that is disposed proximate the first inner axial end 212 such that the first thru-hole 206 includes a stepped configuration including a small diameter portion 318 defining a small diameter 320, and a large diameter portion 322 defining a large diameter 324 that is greater than the small diameter 320. The large diameter portion 322 may extend axially from the first ledge 258 to the first outer axial end 214 of the first coupler 204, while the small diameter portion 320 may extend axially from the large diameter portion 322 to the first inner axial end 212 of the first coupler 204 (see FIG. 8). FIG. 9 shows a different configuration where there are two large diameter portions that axially straddle the small diameter portion. Other configurations of the first thru-hole are possible in other embodiments of the present disclosure.

With continued reference to FIGS. 8 and 9, the rotating member attachment assembly 300 may further comprise a first coupler bushing 240 that is disposed axially in the large diameter portion 322 of the first thru-hole 206 of the first coupler 204, axially abutting the first ledge 258, and a first shaft bushing 246 that is disposed axially in the small diameter portion 318 of the first thru-hole 206 of the first coupler 204, and in the large diameter portion 322 of the first thru-hole 206 of the first coupler 204, radially proximate to the first ledge 258 (FIG. 8 only).

In both FIGS. 8 and 9, the first shaft bushing 246 defines a first shaft bushing outer axial end 326, and the first coupler bushing 240 defines a first coupler bushing outer axial end 328. The first shaft bushing outer axial end 326 may be disposed axially proximate to the first coupler bushing outer axial end 328, and the first coupler bushing outer axial end 328 may be disposed axially proximate to the first axial end 226 of the shaft 218.

The first shaft bushing 246 may be press-fit onto the shaft 218, while the first coupler bushing 240 may be press fit into the first coupler 204. Other forms of attachment are possible in other embodiments of the present disclosure or slip fits may be provided, etc. The first thrust washer 234 may axially abut the first shaft bushing 246 and may be spaced radially away from the first coupler bushing 240 and the first coupler 204, forming a first clearance void 330. Other configurations are possible in other embodiments of the present disclosure. In some embodiments, the bushings may be omitted.

Looking at FIGS. 8 and 9, a replacement kit 400 for a rotating member attachment assembly 200 as just described will now be explained.

The replacement kit 400 may comprise a first thrust washer 234 defining a first thrust washer diameter 402, and a first thrust washer axial thickness 404, as well as a first end cap 230 defining a first end cap axial thickness 406 that also includes a first end cap circumferential surface 408 defining a first end cap diameter 410 that is greater than the first thrust washer diameter 402. As alluded to earlier herein, the first end cap circumferential surface 408 may include external threads 232. Other configurations of these components are possible in other embodiments of the present disclosure.

Furthermore, the first end cap 230 may comprise cast steel material. Other materials may be used in other embodiments. Also, the first end cap diameter 410 may range from 325 mm to 330 mm, and the first end cap axial thickness 406 may range from 60 mm to 80 mm. Other dimensional ranges may be used in other embodiments of the present disclosure. For the first end cap 230, the external threads 232 may include M330x6 type threads but other types and sizes of threads may be used in other embodiments. Similarly, the first thrust washer 234 may comprise steel material, may have a first thrust washer axial thickness 404 that ranges from 60 mm to 80 mm, and a first thrust washer diameter 402 that ranges from 325 mm to 330 mm. Again, other materials and dimensional ranges are possible in other embodiments of the present disclosure.

Referring again to FIGS. 2 thru 8, another embodiment of an undercarriage assembly 500 that may allow a coupler of a rotating member attachment assembly 600 to be easily attached to the frame member 202 of the undercarriage assembly 500 will now be discussed.

Figure 3:
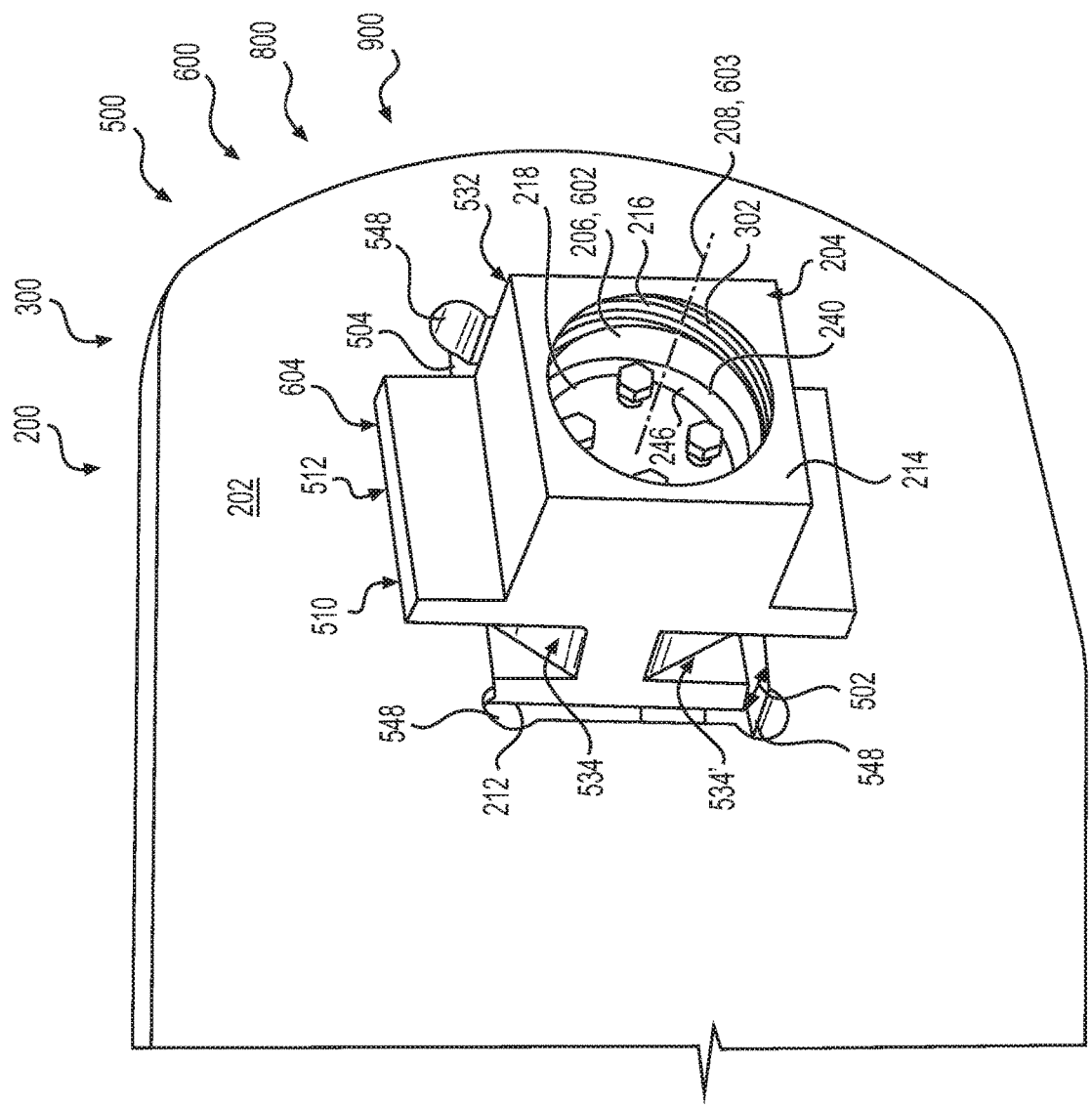
FIG. 3 is alternate perspective view of the frame and rotating member attachment assembly with the coupler of FIG. 2 with the end cap and idler wheel removed.
Figure 4:
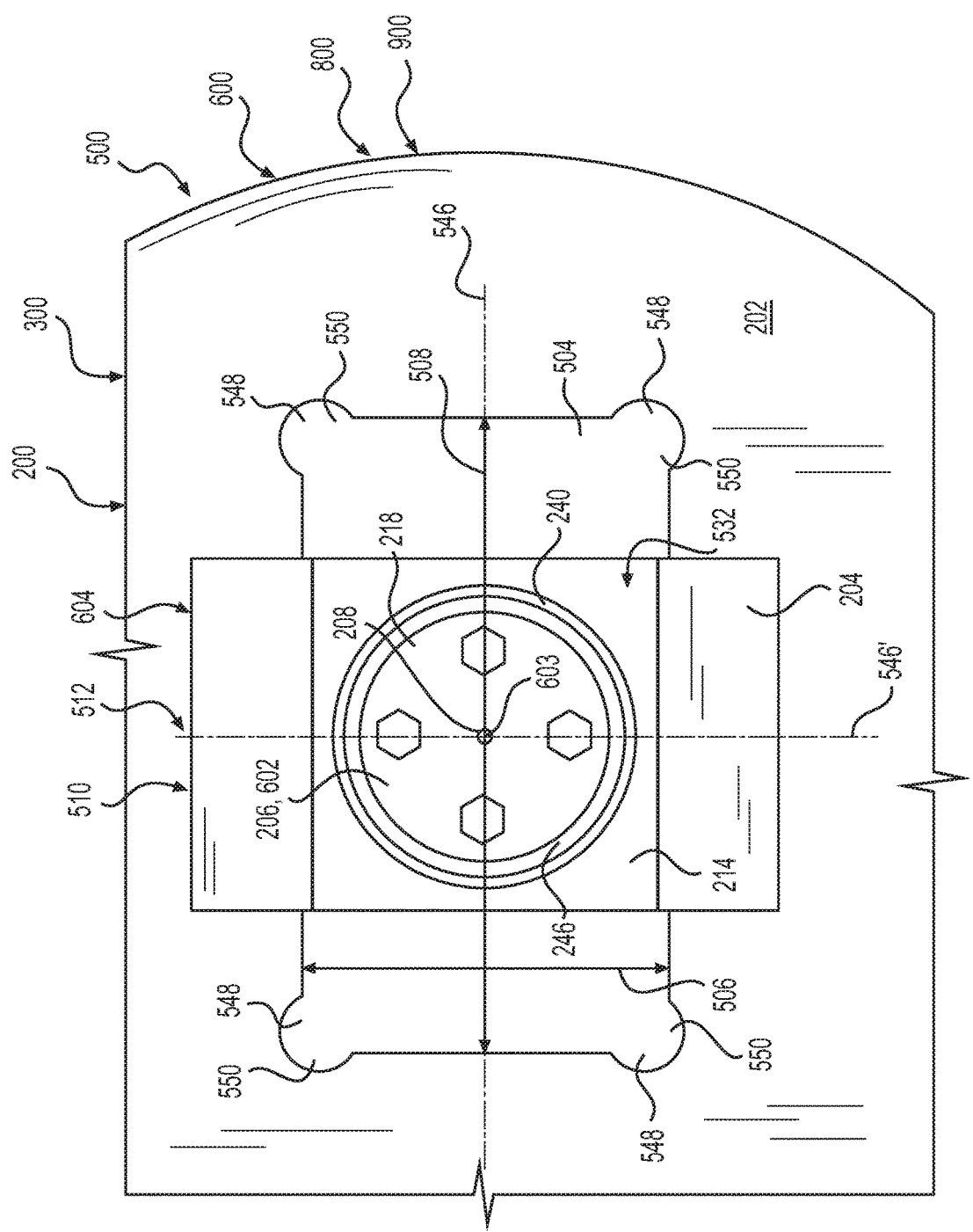
FIG. 4 is a side view of the frame and rotating member attachment assembly with the coupler of FIG. 3.

As best seen in FIGS. 3 and 4, the undercarriage assembly 500 may comprise a first frame member 202 that defines a first frame member thickness 502, a rectangular window 504 defining a width 506, and a length 508 that is greater than the width 506, and a first coupler 204 that is coupled to the first frame member 202. The first coupler 204 may define a first thru-hole 206 that defines a first thru-hole axis 208, and that is configured to receive the shaft 218 (which may be configured as previously described herein).

Looking at FIGS. 3 thru 6, the first coupler 204 may further include a first inner axial end 212, and a first outer axial end 214. The first coupler 204 may further include a first coupler attachment portion 510 that is disposed adjacent to the first inner axial end 212 that includes a first forked rectangular structure 512.

Focusing now on FIGS. 5 and 6, the first forked rectangular structure 512 defines a first minor axis 514 with a first minor axis length 516, and a first major axis 518 with a first major axis length 520 that is greater than the first minor axis length 516. The first forked rectangular structure 512 may include a first prong 522 that is disposed proximate to the first inner axial end 212 of the first coupler 204 and a second prong 524 disposed axially away from the first prong 522 a first predetermined axial distance 526 toward the first outer axial end 214 of the first coupler 204. The first predetermined axial distance 526 may be equal to or greater (e.g. slightly greater in order to provide a suitably tight fit) than the first frame member thickness 502. The length 508 of the rectangular window 504 of the first frame member 502 may be parallel with the first minor axis 514 of the first forked rectangular structure 512 when the undercarriage assembly has been fully assembled (see FIGS. 3 and 4), preventing axial movement of the rotating member attachment assembly 600.

It can be appreciated by looking at FIGS. 5 and 6 that the rectangular window 504 of the first frame member 202, and the first coupler attachment portion 510 of the first coupler 204 are configured such the first coupler 204 may be inserted axially into the rectangular window 504 (see insertion arrow 528) and then rotated ninety degrees (see rotation arrow 530) when attaching the first coupler 204 to the first frame member 202, preventing axial movement of the first coupler 204. The first coupler 204 may then be attached to the first frame member 202 via fastening, welding, adhesion, etc. It should be understood that some play (more than shown in FIGS. 8 and 9) may be present vertically between the first coupler and the first frame member to allow the proper rotation of the first coupler into the locked configuration.

Then, as best understood by looking at FIG. 8, the shaft 218, the first thrust washer 234, and the first end cap 230 may be assembled into the first coupler 204 by axially inserting the shaft 218 after the first thrust washer 234 has been attached to the shaft 218, and then attaching the first end cap 230 to the first coupler 204. Or, if the shaft has not yet been inserted the frame and the rotating member yet, then the first end cap may be attached to the first coupler, and then the shaft and the first thrust washer may be inserted through another coupler on the other side of the frame, through the rotating member and into the first coupler. Assembly would then be completed by attaching another end cap to the additional coupler.

To that end as evidenced by FIGS. 8 and 9, the first coupler 204 may include a first set of internal threads 216 that is disposed in the first thru-hole 206 at the first outer axial end 214 of the first coupler 204. The undercarriage assembly 500 may include a first end cap 230 that includes a first plurality of external threads 232 that mate with the first set of internal threads 216 of the first coupler 204, and the first thrust washer may be disposed axially in the first thru-hole 206 between the first end cap 230, and the first axial end 226 of the shaft 218. Hence, the shaft and the first thrust washer may be axially trapped in the undercarriage assembly. The first thrust washer may or may not be attached to the shaft or the first end cap (e.g. the first thrust washer may be integral with the first end cap in some embodiments of the present disclosure).

Looking at FIGS. 5 thru 9, the first coupler 204 may further include a first coupler ear portion 532 disposed adjacent to the first outer axial end 214 of the first coupler 204 that includes another rectangular configuration (e.g. square instead of rectangular and/or having different dimensions)) that is different than the rectangular configuration of the first forked rectangular structure 512. This first coupler ear portion may house the first axial end 226 of the shaft 218, the first thrust washer 234, and the first end cap 230. Other configurations are possible for the first coupler attachment portion 510, and the first coupler ear portion 532 in other embodiments of the present disclosure.

As best seen in FIGS. 3, 5, and 6, the first forked rectangular structure 512 may include a first cam surface 534 (so called as this surface guides the rotation of the first coupler in the rectangular window) disposed axially between the first prong 522 and the second prong 524, and a second cam surface 534' that is disposed diametrically opposite the first cam surface 534, defining a maximum distance 536 that is measured from the first cam surface 534 to the second cam surface 534' along a direction that is perpendicular to the first thru-hole axis 210 (see FIGS. 8 and 9). The maximum distance 536 is less than or equal to the width 506 of the rectangular window 504 of the first frame member 202 (see FIGS. 8, 9, and 4) so that the first coupler may be rotated and still have a suitably snug fit in the rectangular window 504 of the first frame member 202.

Focusing again on FIGS. 5 and 6, the first cam surface 534 may include a first transitional surface 538 that is disposed proximate the first minor axis 514, and a first apex surface 540 that is intersecting the first major axis 518. The first transitional surface 538 extends from the first apex surface 540 toward the first minor axis 514.

As shown, the first transitional surface 538 may be a first ramp 542, and the first apex surface 540 may be a first flat surface 544. Other configurations for these surfaces are possible including arcuate in other embodiments of the present disclosure.

As best seen in FIG. 4, the first coupler 204 may define a first plane of symmetry 546 (excluding the threads) passing through the first minor axis 514, and the first thru-hole axis 208 of the first coupler 204, and a second plane of symmetry 546' (excluding the threads) passing through the first major axis 518 and the first thru-hole axis 208 of the first coupler 204.

Looking at FIGS. 8 and 9, the first thru-hole axis 208 of the first coupler 204, and the cylindrical axis 220 may be coextensive (or coincident) as previously described herein. Also, as best seen in FIG. 7, the undercarriage assembly 500 may define an axial midplane 236, and may further comprise a second coupler 308 that is identically configured as the first coupler 204, and that is oriented in a symmetrical manner about the axial midplane 236 relative to the first coupler 204. This may not be the case for other embodiments of the present disclosure.

In FIGS. 3 and 4, the rectangular window 504 may have four corners 548, and the first frame member 202 may further define a clearance aperture 550 that is disposed at each of the four corners 548 of the rectangular window 504.

Next, a rotating member attachment assembly 600 that may be used with the undercarriage assembly 500 just described will now be discussed with reference to FIGS. 2 thru 9.

Referring now to FIGS. 3 thru 6, the rotating member attachment assembly 600 may comprise a shaft 218 as previously described herein, and a first coupler 204 defining a first hole 602 (may be a thru-hole or a blind hole) that defines a first hole axis 603, and that is configured to receive the shaft 218. The first coupler 204 may further include a first inner axial end 212, and a first outer axial end 214.

The first coupler 204 may further include a first coupler attachment portion 510 that is disposed adjacent to the first inner axial end 212 and that includes a first forked oblong structure 604 that defines a first minor axis 514 with a first minor axis length 516, and a first major axis 518 with a first major axis length 520 that is greater than the first minor axis length 516. The first forked oblong structure 604 may include a first prong 522 disposed proximate to the first inner axial end 212 of the first coupler 204, and a second prong 524 disposed axially away from the first prong 522 a first predetermined axial distance 526 toward the first outer axial end 214 of the first coupler 204.

The first forked oblong structure 604 may include various configurations including elliptical, oval, racetrack oval, and rectangular, etc.

As alluded to earlier herein the first coupler 204 may further include a first coupler ear portion 532 that is disposed adjacent to the first outer axial end 214 of the first coupler 204 that includes another rectangular configuration or other oblong shape that is different than the rectangular configuration of the first forked oblong structure 604.

Looking at FIGS. 3, 5, and 6, the first forked oblong structure 604 may include a first cam surface 534 that is disposed axially between the first prong 522 and the second prong 524. The first cam surface 534 may include a first transitional surface 538 that is disposed proximate the first minor axis 514 of the first forked oblong structure 604, and a first apex surface 540 that intersects the first major axis 518 of the first forked oblong structure 604. The first transitional surface 538 may extend from the first apex surface 540 toward the first minor axis 514.

The first transitional surface 538 may be a first ramp 542 and the first apex surface 540 may be a first flat surface 544. Other configurations for these features are possible in other embodiments of the present disclosure.

The first coupler may also be symmetrical about two planes of symmetry in a manner previously explained earlier herein (see planes 546, 546' in FIG. 4).

Looking at FIGS. 8 and 9, the first coupler 204 may include a first set of internal threads 216 that is disposed in the first hole 602 at the first outer axial end 214 of the first coupler 204. The rotating member attachment assembly 600 may further comprise a first end cap 230 that includes a first plurality of external threads 232 that mate with the first set of internal threads 216 of the first coupler 204, and a first thrust washer 234 that is disposed axially in the first hole 602 between the first end cap 230 and the first axial end 226 of the shaft 218.

As alluded to earlier herein, the first hole axis 603 of the first coupler 204 and the cylindrical axis 220 may be coextensive (or coincident), but not necessarily so. Likewise, the rotating member attachment assembly 600 may define an axial midplane 236, and may further comprise a second coupler 308 that is identically configured as the first coupler 304, and that is oriented in a symmetrical manner about the axial midplane 236 relative to the first coupler 204 (see FIG. 7). Also, a rotating member that is configured to rotate about the shaft may also be provided as previously described herein.

Now, a replacement kit 700 that may be used with the rotating member attachment assembly 500 just described will now be discussed with reference to FIGS. 2 thru 9.

Focusing on FIGS. 5 and 6, the replacement kit 700 may include a first coupler 204 defining a first thru-hole 206 that defines a first thru-hole axis 208. The first coupler 204 may also comprise a first inner axial end 212, a first outer axial end 214, a first coupler attachment portion 510 including a first forked oblong structure 604 that defines a first minor axis 514 with a first minor axis length 516, and a first major axis 518 with a first major axis length 520 that is greater than the first minor axis length 516. The first forked oblong structure 604 may include a first prong 522 disposed proximate to the first inner axial end 212 of the first coupler 204, a second prong 524 that is disposed axially away from the first prong 522 a first predetermined axial distance 526 toward the first outer axial end 214 of the first coupler 204, and a first cam surface 534 that is disposed axially between the first prong 522, and the second prong 524. A first coupler ear portion 532 may be disposed adjacent to the first outer axial end 214 of the first coupler 204.

The first coupler 204 may comprise cast steel material, the first predetermined axial distance 526 may range from 95 mm to 204 mm, the first minor axis length 516 may range from 300 mm to 400 mm, and the first major axis length 520 may range from 500 mm to 600 mm in some embodiments of the present disclosure. In certain embodiments of the present disclosure, the first major axis length 520 and the first minor axis length 516 may be centered on the first thru-hole axis 208 (i.e. the midpoints of these lengths may be coincident with the first thru-hole axis). These lengths 516, 520 may extend perpendicularly to the first thru-hole axis 208, and the first forked oblong structure 604 may include a rectangular configuration. Other dimensions and configurations for these features are possible in other embodiments of the present disclosure.

The first coupler ear portion 532 may include another rectangular configuration that is different than the rectangular configuration of the first forked oblong structure 604 (e.g. may be square versus rectangular or may have different configurations and/or dimensions). In addition, the first coupler 204 may further include a first set of internal threads 216 that is disposed in the first thru-hole 206 at the first outer axial end 214 of the first coupler 204.

Next, an undercarriage assembly that may use bushings to account for wear caused by the forces exerted on the shaft by the idler or other rotating member will be discussed with reference to FIGS. 2 thru 10.

Focusing on FIGS. 7 thru 10, the undercarriage assembly 800 may comprise a first frame member 202, a shaft 218 that is configured as previously described herein, a rotating member 238 that is configured to rotate about the shaft 218 as also previously described herein, and a first coupler 204 that is attached to the first frame member 202, defining a first thru-hole 206 that defines a first thru-hole axis 208, and that is configured to receive the shaft 218. The first coupler 204 may further include a first inner axial end 212, and a first outer axial end 214.

The undercarriage assembly 800 may further include a first shaft bushing 246 that is press fit onto the shaft 218 at its first axial end 226, and a first coupler bushing 240 that is press fit into the first thru-hole 206 of the first coupler 204. These bushings may absorb the loads exerted on the shaft and the first coupler by the rotating member. When worn, these bushings may be replaced without needing to necessarily replace the shaft or the first coupler, saving time and money caused by maintenance.

Looking more closely at the first coupler in FIGS. 8 and 9, the first coupler 204 may define a first ledge 258 that is disposed proximate to the first inner axial end 212 (i.e. the first ledge 258 is closer to the first inner axial end 212 of the first coupler 204 than the first outer axial end 214) such that the first thru-hole 206 includes a stepped configuration including a small diameter portion 318 defining a small diameter 320, and a large diameter portion 322 defining a large diameter 324 that is greater than the small diameter 320. The large diameter portion 322 may extend axially from the first ledge 258 to the first outer axial end 214 of the first coupler 204.

The first coupler bushing 240 may be disposed axially in the large diameter portion 322 of the first thru-hole 206 of the first coupler 204, axially abutting the first ledge 258.

In FIG. 8, the first shaft bushing 246 may be disposed axially in the small diameter portion 318 of the first thru-hole 206 of the first coupler 204, and in the large diameter portion 322 of the first thru-hole 206 of the first coupler 204, radially proximate to the first ledge 258.

In FIGS. 8 and 9, the first shaft bushing 246 may defines a first shaft bushing outer axial end 326, while the first coupler bushing 240 may define a first coupler bushing outer axial end 328. The first shaft bushing outer axial end 326 may be disposed axially proximate to the first coupler bushing outer axial end 328, and the first coupler bushing outer axial end 328 may be disposed axially proximate to the first axial end 226 of the shaft 218.

In FIG. 8, the first coupler bushing 240 may define a first coupler bushing inner axial end 802, and may include a first shoulder portion 804 that is disposed proximate to the first coupler bushing inner axial end 802 and the first ledge 258 of the first coupler 204. The first shoulder portion 804 may define an inner radial bearing surface 806 that is intended to contact the first shaft bushing 246. The first coupler bushing 240 may also define a first blind hole 808 extending from the first coupler bushing outer axial end 328 to the first shoulder portion 804, defining a first coupler bushing inner cylindrical surface 810 that is spaced radially away from the first shaft bushing 246 a first offset distance 812, forming a first lubrication void 814. The first offset distance 812 may range from 0.100 mm to 1.0 mm in some embodiments of the present disclosure but may be altered to be different in other embodiments.

As also shown in FIG. 8, the first coupler bushing 240 may further define a first radially extending thru-hole 816 that is in fluid communication with the first lubrication void 814, and the first coupler 204 may also define a first lubrication supply hole 818 that is in communication with the first radially extending thru-hole 816.

In FIG. 9, the first shaft bushing 246 may be disposed axially in the large diameter portion 322 of the first thru-hole 206 of the first coupler 204 on one side of the first ledge 258, and the first coupler bushing 240 may also be disposed axially in the large diameter portion 322 of the first thru-hole 206 of the first coupler 204 on the same side of the first ledge 258. The first shaft bushing 246 may also stop axially short of the first ledge 258 (i.e. the first shaft bushing 246 may be spaced axially away from the first ledge 258).

As also seen in FIG. 9, the first ledge 258 may be spaced axially away from the first inner axial end 212 of the first coupler 204, and the undercarriage assembly 800 may further comprise a dust seal 260 that is axially abutting the first ledge 258 and that is disposed axially proximate to the first inner axial end 212 of the first coupler 204.

Now, a rotating member attachment assembly 900 that may be used with the undercarriage assembly 800 just described herein will be discussed.

Looking at FIGS. 7 thru 9, the rotating member attachment assembly 900 may comprise a shaft 218 that is configured as earlier described herein, a first coupler 204 defining a first hole 602 that defines a first hole axis 603 and that is configured to receive the shaft 218. The first coupler 204 may further include a first inner axial end 212, and a first outer axial end 214.

The rotating member attachment assembly 900 may also comprise a first shaft bushing 246 disposed on the shaft 218 at its first axial end 226, and a first coupler bushing 240 that is disposed in the first hole 602 of the first coupler 204.

In FIGS. 8 and 9, the first coupler 204 defines a first ledge 258 that is disposed proximate to the first inner axial end 212 of the first coupler 204 such that the first hole 602 includes a stepped configuration including a small diameter portion 318 defining a small diameter 320, and a large diameter portion 322 defining a large diameter 324 that is greater than the small diameter 320, and the large diameter portion 322 extends axially from the first ledge 258 to the first outer axial end 214 of the first coupler 204. Other configurations are possible in other embodiments of the present disclosure.

The first hole 602 of the first coupler 204 may be a first thru-hole 210, and the first coupler bushing 240 may be disposed axially in the large diameter portion 322 of the first thru-hole 206 of the first coupler 204, axially abutting the first ledge 258.

In FIG. 8, the first shaft bushing 246 is disposed axially in the small diameter portion 318 of the first thru-hole 206 of the first coupler 204, and in the large diameter portion 322 of the first thru-hole 206 of the first coupler 204, radially proximate to the first ledge 258.

In FIGS. 8 and 9, the first shaft bushing 246 may defines a first shaft bushing outer axial end 326, the first coupler bushing 240 may define a first coupler bushing outer axial end 328. The first shaft bushing outer axial end 326 may be disposed axially proximate to the first coupler bushing outer axial end 328. The first coupler bushing outer axial end 328 may be disposed axially proximate to the first axial end of the shaft 226. The first shaft bushing 246 may be press-fit onto the shaft 218, and the first coupler bushing 240 may be press fit into the first coupler 204.

In FIG. 8, the first coupler bushing 240 may define a first coupler bushing inner axial end 802, and may include a first shoulder portion 804 disposed proximate to the first coupler bushing inner axial end 802, and to the first ledge 258 of the first coupler 204. The first shoulder portion 804 may define an inner radial bearing surface 806 as previously described herein. The first coupler bushing 240 may also define a first blind hole 808 extending from the first coupler bushing outer axial end 328 to the first shoulder portion 804, defining a first coupler bushing inner cylindrical surface 810 that is spaced radially away from the first shaft bushing 246 a first offset distance 812, forming a first lubrication void 814. The first offset distance 812 may range from 0.100 mm to 1.0 mm, but may be altered as needed or desired.

The first coupler bushing 240 may further define a first radially extending thru-hole 816 that is in fluid communication with the first lubrication void 814, and the first coupler 204 may also define a first lubrication supply hole 818 that is in communication with the first radially extending thru-hole 816.

In FIG. 9, the first shaft bushing 246 may be disposed axially in the large diameter portion 322 of the first thru-hole 206 of the first coupler 204 on one side of the first ledge 258, and the first coupler bushing 240 may be also disposed axially in the large diameter portion 322 of the first thru-hole 206 of the first coupler 204 on the same side of the first ledge 258. The first shaft bushing 246 may stop axially short of the first ledge 258.

The first ledge 258 may be spaced axially away from the first inner axial end 212 of the first coupler 204. The rotating member attachment assembly 900 may further comprise a dust seal 260 that is axially abutting the first ledge 258 and that is disposed axially proximate to the first inner axial end 212 of the first coupler 204.

Still referring to FIGS. 8 and 9, a replacement kit 1000 for the rotating member attachment assembly 900 may be characterized as follows.

The replacement kit 1000 may comprise a first shaft bushing 246 that includes an annular cylindrical configuration including a first shaft bushing cylindrical axis 1002, a first shaft bushing radial direction 1004, a first shaft bushing inner axial end 1006, and a first shaft bushing outer axial end 326. The first shaft bushing 246 also defines a first shaft bushing axial length 1010 measured from the first shaft bushing inner axial end 1006 to the first shaft bushing outer axial end 326. The first shaft bushing 246 also includes a first shaft bushing outer circumferential surface 1012 that defines a first shaft bushing outer diameter 1014, and a first shaft bushing inner circumferential surface 1016 that defines a first shaft bushing inner diameter 1018.

The replacement kit 1000 may also comprise a first coupler bushing 240 including an annular cylindrical configuration that may define a first coupler bushing cylindrical axis 1002, a first coupler bushing radial direction 1022, a first coupler bushing inner axial end 802, and a first coupler bushing outer axial end 328. The first coupler bushing 240 may also define a first coupler bushing axial length 1028 measured from the first coupler bushing inner axial end 802 to the first coupler bushing outer axial end 328. The first coupler bushing 240 may also include a first coupler bushing outer circumferential surface 1030 that defines a first coupler bushing outer diameter 1032, and a first coupler bushing inner circumferential surface 1034 that defines a first coupler bushing inner diameter 1036. The first coupler bushing inner diameter 1036 may be greater than the first shaft bushing outer diameter 1014.

In FIG. 8, the first coupler bushing 240 may include a first shoulder portion 804 that is disposed proximate to the first coupler bushing inner axial end 802, and that defines a first coupler bushing inner cylindrical surface 810 that is disposed radially between the first coupler bushing inner circumferential surface 1034, and the first coupler bushing outer circumferential surface 1030. The first coupler bushing 240 may further define a first radially extending thru-hole 816 that extends radially from the first coupler bushing outer circumferential surface 1030 to the first coupler bushing inner cylindrical surface 810.

The first shaft bushing 246 may comprise TOUGHMET® material, and the first coupler bushing 240 may comprise TOUGHMET® material. The first coupler bushing inner diameter 1036 may range from 250 mm to 350 mm, while the first coupler bushing outer diameter 1032 may range from 250 mm to 450 mm (with some clearance provided). Similarly, the first shaft bushing outer diameter 1014 may range from 200 mm to 350 mm, while the first shaft bushing inner diameter 1018 may range from 200 mm to 350 mm (with some clearance provided). The first shaft bushing axial length 1010 may range from 200 mm to 450 mm, while the first coupler bushing axial length 1028 may range from 200 mm to 450 mm.

Again, it should be noted that any of the dimensions, materials, and/or configurations of various features and/or various components may be varied as desired or needed including those not specifically mentioned herein.

INDUSTRIAL APPLICABILITY

In practice, a machine, an undercarriage assembly, a rotating member assembly, a bushing, an end cap, a thrust washer, a coupler, a replacement kit, and/or any combination of these various assemblies and components may be manufactured, bought, or sold to retrofit a machine, an undercarriage assembly or a rotating member attachment assembly in the field in an aftermarket context, or alternatively, may be manufactured, bought, sold or otherwise obtained in an OEM (original equipment manufacturer) context.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A rotating member attachment assembly comprising:
    a shaft including a cylindrical configuration defining a cylindrical axis, a circumferential direction, and a radial direction, the shaft further defining a first axial end and a second axial end along the cylindrical axis; and
    a first coupler defining a first hole that defines a first hole axis and that is configured to receive the shaft, the first coupler further including a first inner axial end, and a first outer axial end;
    wherein the first coupler further includes a first coupler attachment portion disposed adjacent to the first inner axial end including a first forked oblong structure that defines a first minor axis with a first minor axis length, and a first major axis with a first major axis length that is greater than the first minor axis length, the first forked oblong structure including a first prong disposed proximate to the first inner axial end of the first coupler and a second prong disposed axially away from the first prong a first predetermined axial distance toward the first outer axial end of the first coupler.

2. The rotating member attachment assembly of claim 1 wherein the first forked oblong structure includes a rectangular configuration.

3. The rotating member attachment assembly of claim 2 wherein the first coupler further includes a first coupler ear portion disposed adjacent to the first outer axial end of the first coupler that includes another rectangular configuration that is different than the rectangular configuration of the first forked oblong structure.

4. The rotating member attachment assembly of claim 1 wherein the first forked oblong structure includes a first cam surface disposed axially between the first prong and the second prong.

5. The rotating member attachment assembly of claim 4 wherein the first cam surface includes a first transitional surface disposed proximate the first minor axis, and a first apex surface intersecting the first major axis, and the first transitional surface extends from the first apex surface toward the first minor axis.

6. The rotating member attachment assembly of claim 5 wherein the first transitional surface is a first ramp and the first apex surface is a first flat surface.

7. The rotating member attachment assembly of claim 6 wherein the first coupler defines a first plane of symmetry passing through the first minor axis and the first hole axis of the first coupler, and a second plane of symmetry passing through the first major axis and the first hole axis of the first coupler.

8. The rotating member attachment assembly of claim 7 wherein the first coupler includes a first set of internal threads disposed in the first hole at the first outer axial end of the first coupler, the rotating member attachment assembly further comprising:
    a first end cap that includes a first plurality of external threads that mate with the first set of internal threads of the first coupler; and
    a first thrust washer disposed axially in the first hole between the first end cap and the first axial end of the shaft.

9. The rotating attachment assembly of claim 1 wherein the first hole axis and the cylindrical axis are coextensive, and the rotating member attachment assembly defines an axial midplane and further comprises
    a second coupler that is identically configured as the first coupler and is oriented in a symmetrical manner about the axial midplane relative to the first coupler.

* * * * *